(12) United States Patent
Seneski et al.

(10) Patent No.: US 9,588,956 B2
(45) Date of Patent: Mar. 7, 2017

(54) PARSER GENERATION

(71) Applicant: Ab Initio Technology LLC, Lexington, MA (US)

(72) Inventors: Mark E Seneski, Chestnut Hill, MA (US); Alexander Shulman, Weston, MA (US)

(73) Assignee: AB INITIO TECHNOLOGY LLC, Lexington, MA (US)

( * ) Notice: Subject to any disclaimer, the term of this patent is extended or adjusted under 35 U.S.C. 154(b) by 581 days.

(21) Appl. No.: 14/087,158

(22) Filed: Nov. 22, 2013

(65) Prior Publication Data
US 2015/0019576 A1    Jan. 15, 2015

Related U.S. Application Data

(60) Provisional application No. 61/845,722, filed on Jul. 12, 2013.

(51) Int. Cl.
*G06F 17/30* (2006.01)
*G06F 17/27* (2006.01)
(Continued)

(52) U.S. Cl.
CPC ............ *G06F 17/2705* (2013.01); *G06F 8/37* (2013.01); *G06F 17/2258* (2013.01); *G06F 17/272* (2013.01)

(58) Field of Classification Search
CPC .................................. G06F 8/37; G06F 17/2705
USPC ............... 707/755, 756, 778, 796, 803, 811; 717/104
See application file for complete search history.

(56) References Cited

U.S. PATENT DOCUMENTS

7,509,654 B2 *  3/2009  Jennings ............... G06F 9/4436
                                                717/100
7,685,083 B2 *  3/2010  Fairweather ............ G06F 8/427
                                                706/45
(Continued)

OTHER PUBLICATIONS

Giorgios Robert Economopoulos, "Generalized LR parsing algorithms" *PhD thesis for Dept. of Computer Science*, Royal Holloway, University of London (Aug. 2006).
(Continued)

*Primary Examiner* — Marc Filipczyk
(74) *Attorney, Agent, or Firm* — Occhiuti & Rohlicek LLP

(57) ABSTRACT

Generating a data parser for parsing an input stream of data objects includes receiving information representative of a hierarchical data format defining a plurality of objects organized in a hierarchy. The objects include one or more schema objects representing data objects, and one or more container objects each associated with one or more schema objects. The generating also includes processing the received information to form the data parser. The processing includes determining permissible transitions between successive data objects in the input stream, based at least in part on the information representative of the hierarchical data format. The processing also includes associating one or more data operations with each of the determined permissible transitions. The processing also includes storing a specification for configuring a processor to execute the data parser to: (1) recognize a transition between a first data object and a second data object in the input stream, and (2) perform a data operation associated with the recognized transition on a data value within the second data object based at least in part on a context associated with one or more previously recognized transitions.

49 Claims, 10 Drawing Sheets

(51) Int. Cl.
*G06F 9/44* (2006.01)
*G06F 17/22* (2006.01)

(56) References Cited

U.S. PATENT DOCUMENTS

| | | | | |
|---|---|---|---|---|
| 8,126,835 | B2* | 2/2012 | Van Lunteren | H04L 63/1408 |
| | | | | 706/48 |
| 8,429,605 | B2* | 4/2013 | Cruise | G06F 8/35 |
| | | | | 717/104 |
| 8,504,984 | B1* | 8/2013 | Yang | G06F 8/33 |
| | | | | 717/111 |
| 2004/0172591 | A1 | 9/2004 | Rothschiller et al. | |
| 2007/0113221 | A1 | 5/2007 | Liu et al. | |
| 2008/0046874 | A1 | 2/2008 | Kostoulas et al. | |
| 2009/0083313 | A1 | 3/2009 | Stanfill et al. | |
| 2011/0153667 | A1 | 6/2011 | Parmenter et al. | |

OTHER PUBLICATIONS

Sample and Neufeld, "Snacc 1.0: A High Performance ASN.1 to C/C++ Compiler" *Computer Communications*, University of British Columbia (Feb. 1993).

Trevor Blackwell, "Fast Decoding of Tagged Message Formats" *IEEE Infocom: Fifteenth Annual Joint Conference of the IEEE Computer Societies*, 1: 224-231 (Mar. 1996).

Pang et al. "binpac: A yacc for Writing Application Protocol Parsers" *Proceedings of the 6th ACM SIGCOMM conference on Internet measurement*, pp. 289-300, (2006).

Sylvain Schmitz, "Noncanonical LALR(1) Parsing" *Proceedings of the 10$^{th}$ International Conference of Developments in Language Theory*, 4036: 95-107 (Jun. 2006).

Boyland and Spiewak "Tool Paper: ScalaBison Recursive Ascent-Descent Parser Generator" *Electronic Notes in Theoretical Computer Science: Proceedings of the 9$^{th}$ Workshop on Language Descriptions Tools and Applications*, 253(7): 65-74 (Sep. 2010).

Borisov et al. "A Generic Application-Level Protocol Analyzer and its Language" *14$^{th}$ Annual Network & Distributed System Security Symposium* (Mar. 2007).

Donnelly and Stallman, "Bison—The Yacc-compatible Parser Generator" *Free Software Foundation*, Boston, MA, version 2.7 (Dec. 2012).

Ronald Veldema, "Jade, a recursive ascent LALR(1) parser generator" *Technical report*, Vrije Universiteit Amsterdam, Netherlands (2001).

International Search Report, PCT Application No. PCT/US2014/044790, mailed Nov. 13, 2014 (4 pages).

* cited by examiner

400

660 — Scope_A {
　　int a1 (optional)
　　int a2
　　Scope_B (optional){
　　　　string b3 (optional)
　　　　Scope_C [ ] (optional) {
　　　　　　int c4
　　　　　　int c5
　　　　}
　　}
　　int a6
}

| Src. | | Dest. | Looping? | Highest Node |
|---|---|---|---|---|
| ∅ | → | a1, | No_Loop, | ∅ |
| ∅ | → | a2, | No_Loop, | ∅ |
| a1 | → | a2, | No_Loop, | SEQ_A |
| a2 | → | b3, | No_Loop, | SEQ_A |
| a2 | → | c4, | No_Loop, | SEQ_A |
| a2 | → | c5, | No_Loop, | SEQ_A |
| a2 | → | a6, | No_Loop, | SEQ_A |
| b3 | → | a6, | No_Loop, | SEQ_A |
| c4 | → | c5, | No_Loop, | SET_C |
| c4 | → | c5, | End_Instance, | VectorCntr1 |
| c4 | → | c4, | End_Instance, | VectorCntr1 |
| c4 | → | a6, | No_Loop, | SEQ_A |
| c5 | → | c4, | No_Loop, | SET_C |
| c5 | → | c4, | End_Instance, | VectorCntr1 |
| c5 | → | c5, | End_Instance, | VectorCntr1 |
| c5 | → | a6, | No_Loop, | SEQ_A |
| a6 | → | a1, | End_Record, | ∅ |
| a6 | → | a2, | End_Record, | ∅ |

FIG. 8

| | | | |
|---|---|---|---|
| ∅ | → | a2, | parse(a2) |
| a2 | → | c4, | push(SCOPE_B), push(SCOPE_C), parse(c4) |
| c4 | → | c5, | parse(c5) |
| C5 | → | C5 | End_Instance( ), parse(c5) |
| C5 | → | C4, | parse(c4) |
| C4 | → | A6, | pop(SCOPE_C), pop(SCOPE_B), parse(a6) |

FIG. 11

PARSER GENERATION

CROSS-REFERENCE TO RELATED APPLICATIONS

This application claims the benefit of U.S. Provisional Application No. 61/845,722 filed Jul. 12, 2013, incorporated herein by reference.

BACKGROUND

This description relates to parser generation.

Some systems user parsers for analyzing an input and determining relationships among different portions of that input in order to interpret the input. Some parsers are written manually by a programmer. Some parsers are generated automatically by a parser generator. For example, some parser generators (also called compiler-compilers, such as yacc or Bison) accept as input a grammar with production rules (or simply "productions"), which describe syntactic elements, and relationships among them, that are considered to be valid according to that grammar. The parser generator provides as output information for parsing an input that conforms to the grammar that was provided to the parser generator. Various kinds of parsers may be used for processing a variety of different kinds of data. For example, an application-protocol parser translates packet streams into high-level representations of the traffic in those packet streams.

SUMMARY

In one aspect, in general, a method for generating a data parser for parsing an input stream of data objects includes: receiving information representative of a hierarchical data format defining a plurality of objects organized in a hierarchy, the objects including one or more schema objects representing data objects, and one or more container objects each associated with one or more schema objects; and processing the received information to form the data parser. The processing includes: determining permissible transitions between successive data objects in the input stream, based at least in part on the information representative of the hierarchical data format; associating one or more data operations with each of the determined permissible transitions; and storing a specification for configuring a processor to execute the data parser to: (1) recognize a transition between a first data object and a second data object in the input stream, and (2) perform a data operation associated with the recognized transition on a data value within the second data object based at least in part on a context associated with one or more previously recognized transitions.

Aspects can include one or more of the following features.

The information representative of the hierarchical data format includes a tree representation of the hierarchical data format including a plurality of nodes interconnected by a plurality of edges with each of the plurality of nodes representing one of the plurality of objects defined by the hierarchical data format.

The context associated with one or more previously recognized transitions corresponds to a position in the tree representation of the hierarchical data format.

The at least one of the schema objects includes a tag that is included with a corresponding data object represented by the schema object.

The container objects include at least one container object representing at least one of: a sequence of contained data objects within the input stream, a set of contained data objects within the input stream, or a choice of one contained data object within the input stream among multiple possible data objects.

At least some of the container objects are specified as representing a series of multiple containers of data objects within the input stream.

At least some objects of the plurality of objects are designated in the hierarchical data format as optional.

Determining permissible transitions between the objects of the hierarchical data format in the input stream includes: generating a compilation tree representation of the hierarchical data format, the compilation tree representation including a plurality of nodes interconnected by a plurality of edges with at least some of the plurality of nodes representing one of the plurality of objects defined by the hierarchical data format and at least some of the plurality of nodes representing compilation specific objects.

The nodes representing compilation specific objects include one or more of vector container nodes, root nodes, empty tag nodes, and fan-out only nodes.

Determining permissible transitions between the objects of the hierarchical data format in the input stream includes processing the compilation tree representation to determine all permissible transitions between the nodes of the compilation tree representation.

Processing the compilation tree representation to determine all permissible transitions between the nodes of the compilation tree representation includes, for each node of the compilation tree representation, determining all nodes that have transitions to the node and determining all nodes to which the node has at least one transition.

Processing the compilation tree representation to determine all permissible transitions between the nodes of the compilation tree representation includes combining duplicate transitions between the nodes and eliminating incomplete transitions between the nodes.

The method further comprises generating an elaborated edge for each permissible transition identified, the elaborated edge including a source node associated with the transition, a destination node associated with the transition, a container node associated with the transition, and a looping behavior associated with the transition.

Associating one or more data operations with each of the identified transitions includes analyzing each elaborated edge to determine the one or more data operations.

The one or more data operations includes an operation for pushing into a scope of a container object, an operation for popping out of a scope of a container object, and an operation for reading a value of a data object.

Determining permissible transitions between the objects of the hierarchical data format in the input stream includes generating an output that includes at least one of: an indication that the hierarchical data format does not include any ambiguous definitions, an indication that the hierarchical data format does include one or more ambiguous definitions, or one or more possible resolutions of any ambiguous definitions included in the hierarchical data format.

Data representative of the hierarchical data format is specified using at least one of: ASN.1 notation, XML notation, SWIFT notation, X12 notation, and HL7 notation.

In another aspect, in general, a system for generating a data parser for parsing an input stream formatted according to a hierarchical data format includes: an input device or port configured to receive information representative of a hierarchical data format defining a plurality of objects organized in a hierarchy, the objects including one or more schema objects representing data objects, and one or more container objects each associated with one or more schema objects; and at least one processor configured to process the received information to form the data parser. The processing includes: determining permissible transitions between successive data objects in the input stream, based at least in part on the information representative of the hierarchical data format; associating one or more data operations with each of the determined permissible transitions; and storing a specification for configuring a processor to execute the data parser to: (1) recognize a transition between a first data object and a second data object in the input stream, and (2) perform a data operation associated with the recognized transition on a data value within the second data object based at least in part on a context associated with one or more previously recognized transitions.

In another aspect, in general, a system for generating a data parser for parsing an input stream formatted according to a hierarchical data format includes: means for receiving information representative of a hierarchical data format defining a plurality of objects organized in a hierarchy, the objects including one or more schema objects representing data objects, and one or more container objects each associated with one or more schema objects; and means for processing the received information to form the data parser. The processing includes: determining permissible transitions between successive data objects in the input stream, based at least in part on the information representative of the hierarchical data format; associating one or more data operations with each of the determined permissible transitions; and storing a specification for configuring a processor to execute the data parser to: (1) recognize a transition between a first data object and a second data object in the input stream, and (2) perform a data operation associated with the recognized transition on a data value within the second data object based at least in part on a context associated with one or more previously recognized transitions.

In another aspect, in general, software is stored on a computer-readable medium, for generating a data parser for parsing an input stream of data objects. The software includes instructions for causing a computing system to: receive information representative of a hierarchical data format defining a plurality of objects organized in a hierarchy, the objects including one or more schema objects representing data objects, and one or more container objects each associated with one or more schema objects; and process the received information to form the data parser. The processing includes: determining permissible transitions between successive data objects in the input stream, based at least in part on the information representative of the hierarchical data format; associating one or more data operations with each of the determined permissible transitions; and storing a specification for configuring a processor to execute the data parser to: (1) recognize a transition between a first data object and a second data object in the input stream, and (2) perform a data operation associated with the recognized transition on a data value within the second data object based at least in part on a context associated with one or more previously recognized transitions.

Aspects may have one or more of the following advantages.

Organizations manage data from multiple different systems. Some systems may produce datasets of data in a format native to the system. Other systems produce datasets using a non-native format that conforms to a standard such as: comma separated values (csv), extensible markup language (XML), Abstract Syntax Notation One (ASN.1), Society for Worldwide Interbank Financial Telecommunication (SWIFT), X12, or another standard. Generally, even when the dataset is known to use a particular standard, the data objects within the dataset may need to be parsed according to a specific data format that conforms to that particular standard.

Some systems accept datasets provided by other systems through an import mechanism. The import mechanism converts the external dataset into a format native to the system for processing. One such import mechanism is a data parser that analyzes an input stream of data (e.g., a message or other document encoded as binary data, or using a character set, such as ASCII text) formatted according to a particular data format (e.g., a schema), and recognizes its component parts, which are then used to populate fields of a native data record. A schema may be used, for example, to define different possible valid sequences of data objects that may appear in an input stream. The data objects within the input stream may be explicitly tagged, or implicitly recognizable as separate data objects within the input stream.

Among other advantages the data parsers generated using the approaches described herein can be configured to perform data operations that are compatible with any hierarchical data format, and save on development time. This is an improvement over conventional data parsers, which are typically developed with a static set of data formats in mind and must be redeveloped or retrofitted to accommodate additional data formats, and may not be able to perform custom data operations as the data is being parsed.

The approaches described herein can convert data formatted according to a generalized hierarchical tag value schema to any other data format.

The approaches described herein can result in performance improvements over conventional approaches since operations such as context checks are reduced.

The approaches described herein, may utilize "global routing" as opposed to selective "local routing." Very generally, a data parser which utilizes "global routing" takes into account some or all of the permissible transitions between elements at all levels of a given hierarchical nested target data format for each parsing operation that it performs. A data parser which utilizes "local routing" takes into account only the permissible transitions between elements at a single level of a given hierarchical nested target data format for each parsing operation that it performs. The use of "global routing" potentially reduces the amount of checking (e.g., length checking) required by the parser. Specifically, in a case of hierarchical nested schemas, each level of the schema may require a separate test if done locally, whereas if done globally can be identified with one and only one lookup or test. Thus, in some examples an extra check before or after every parse operation is eliminated and length checking is performed sparingly e.g., to verify the integrity of the data or to handle an ambiguous route.

Other features and advantages of the invention are apparent from the following description, and from the claims.

DESCRIPTION OF DRAWINGS

FIG. 6 is a scope tree representation of an exemplary data format.

FIG. 8 is a list of transitions associated with data operations.

FIG. 11 is a list of transitions associated with data operations.

DESCRIPTION

1 System Overview

Figure 1:
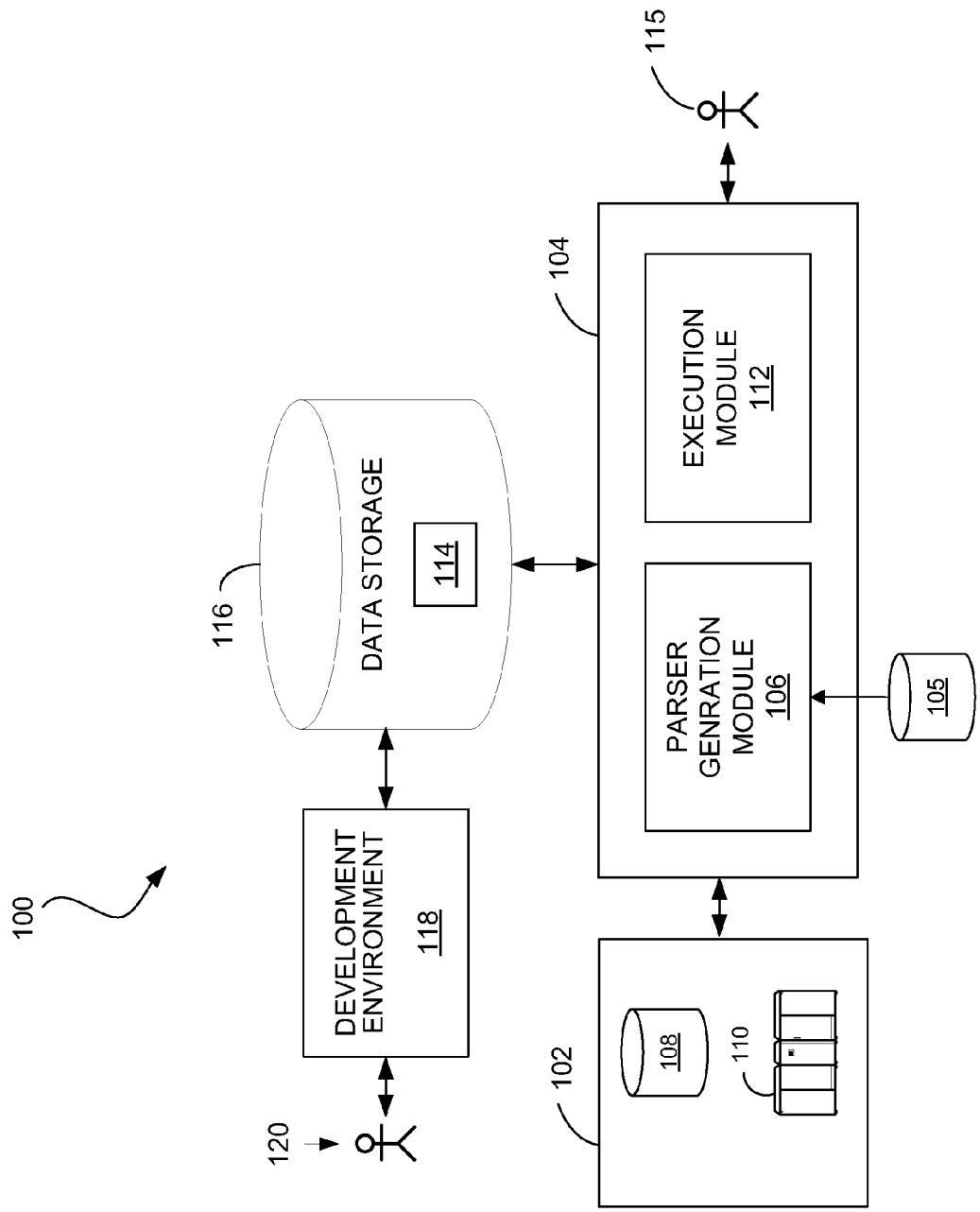
FIG. 1 is a diagram of a data processing system.

FIG. 1 shows an exemplary data processing system 100 in which the parser generation techniques can be used. The system 100 includes a data source 102 that may include one or more sources of data such as storage devices or connections to online data streams, each of which may store data in any of a variety of storage formats (e.g., database tables, spreadsheet files, flat text files, or a native format used by a mainframe computer). An execution environment 104 includes a parser generation module 106 and an execution module 112. The execution environment 104 may be hosted on one or more general-purpose computers under the control of a suitable operating system, such as the UNIX operating system. For example, the execution environment 104 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remote, or remotely distributed (e.g., multiple processors coupled via a local area network (LAN) and/or wide-area network (WAN)), or any combination thereof. In some implementations, the execution module 112 provides an operating system, which may be a parallel operating system running on one or more processors, and the parser generation module 106 is executed as a program running in that operating system. A user 115 is also able to interact with the execution environment 104 by viewing displayed outputs and entering inputs in a user interface.

The parser generation module 106 receives data representative of a target data format 105, the target data format 105 defining allowed structure of possible data objects that are considered to be (correctly) formatted according to that target data format 105, and allowed ordering among multiple data objects appearing in an input stream. The target data format 105 may optionally conform to a standard that describes a schema for defining what kinds of data objects are permissible in terms of schema objects and relationships among the schema objects. The structure defined by the target data format 105 may include schema objects that represent data objects containing data values (e.g., a tagged data object in which a data value is recognizable based on associated tags), and container objects that may contain schema objects or other container objects based on a potentially nested structure (e.g., sequences of tags, sets of tags, etc.). For example, if the target data format 105 conforms to a version of the ASN.1 standard, a schema object may represent a data object that consists of: a tag associated with a data value, followed by a length of the data value, followed by the data value itself. If the target data format 105 conforms to a version of the XML standard, a schema object may represent a data object that consists of a start tag, followed by a data value, followed by an end tag. In some examples, the target data format 105 can be presented as a hierarchy (e.g., a tree or other form of hierarchical representation) with schema objects and container objects representing nodes of the hierarchy.

The target data format 105 describes an expected format of data objects in an input stream (e.g., a data stream including a succession of data objects formatted according to the target data format 105), which will arrive at the execution environment 104 from the data source 102. The target data format 105 also implicitly determines what transitions between successive data objects in the input stream are permissible based on the structure of the hierarchy, including the ordering among schema objects and container objects within the hierarchy. The parser generation module 106 processes the target data format to generate a parser that is capable of parsing the input stream from the data source 102. For target data formats conforming to some standards (such as ASN.1) the input stream may also include tags (or other markers or delimiters) that indicate the start (or end) of contained data objects for various types of container objects (e.g., for sequences or sets), but the system 100 is able to process input streams with or without such tags. In general, when the execution environment 104 receives data from the input stream, the execution module 112 of the execution environment 104 uses the generated parser to interpret the data in the input stream received from the data source 102 and to recognize transitions among tagged data objects and to process the data values in those data objects using data operations to store results 114, which may include populating records that are native to the execution environment 104. In some examples, the records are stored in the data storage system 116. Storage devices providing the data source 102 and the data storage system 116 may be local to the execution environment 104, for example, being stored on a storage medium connected to a computer running the execution environment 104 (e.g., a hard drive 108), or may be remote to the execution environment 104, for example, being hosted on a remote system (e.g., a mainframe 100) in communication with a computer running the execution environment 104, over a remote connection.

The data storage system 116 is also accessible to a development environment 118 in which a developer 120 is able to develop programs to be executed by the execution module 112 to apply additional processing to data being parsed, the stored results 114, and/or other data. The development environment 118 is, in some implementations, a system for developing applications as dataflow graphs that include vertices (representing components or datasets) connected by directed links (representing flows of work elements) between the vertices. For example, such an environment is described in more detail in U.S. Publication No. 2007/0011668, entitled "Managing Parameters for Graph-Based Applications," incorporated herein by reference. A system for executing such graph-based computations is described in U.S. Pat. No. 5,966,072, EXECUTING COMPUTATIONS EXPRESSED AS GRAPHS, incorporated herein by reference. Dataflow graphs made in accordance with this system provide methods for getting information into and out of individual processes represented by graph components, for moving information between the processes, and for defining a running order for the processes. This system includes algorithms that choose interprocess communication methods (for example, communication paths according to the links of the graph can use TCP/IP or UNIX domain sockets, or use shared memory to pass data between the processes).

Figure 2:
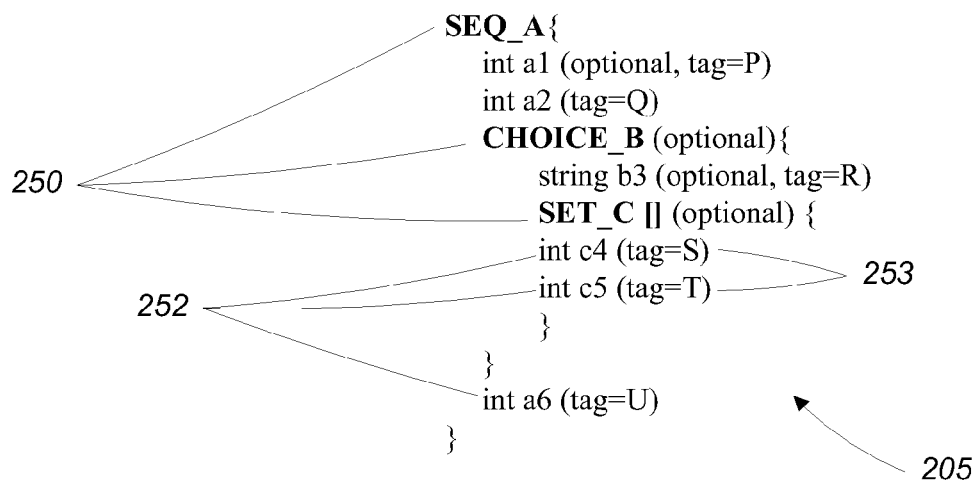
FIG. 2 is an exemplary data format.

Referring to FIG. 2, a simple example of a target data format 205 defines a number of container objects 250, each including one or more schema objects 252. In some examples, the target data format 205 is specified using a standardized notation such as an XML or ASN.1 notation, which enables specification of permissible format and ordering among data objects in an input stream according to a defined schema, and includes notation for specifying schema objects and container objects. A "schema object," as used herein, includes any element a defined schema that is used to represent a group of related data objects. Very generally, examples of a container object (also called, simply, a "container") include a sequence container (i.e., containing an ordered set of objects), a set container (i.e., containing a set of objects from which one or more objects can be chosen), or a choice container (i.e., containing a set of objects from which only one object can be chosen). The objects within a container object can be schema objects, or other container objects, enabling a nested structure that forms a hierarchy. A schema object 252 includes a tag 253, which will appear within a corresponding data object in an input stream to identify a specific associated data value, and a field name that the system 100 will use to represent a data value within records populated by generated parser. The schema object 252 may have an associated data type representing a type (e.g., "int" for integer or "string," as shown in FIG. 2) of that data value. In some data formats the field name is the name of a tag, or is associated with one or more tags. In some of the following examples, a schema object with a tag "T" and a field name "n" will be described as schema object "T(n)".

The following is an example of the target data format 205 in ASN.1 notation.

```
MOD DEFINITIONS IMPLICIT TAGS ::=
BEGIN
A ::= SEQUENCE
{
  a1            TagP OPTIONAL,
  a2            TagQ,
  b             B OPTIONAL,
  a6            TagU
}
B ::= CHOICE
{
  b3            TagR,
  c             SET OF C
}
C ::= SET
{
  c4            TagS,
  c5            TagT
}
TagP    ::=  [UNIVERSAL 80]   INTEGER
TagQ    ::=  [UNIVERSAL 81]   INTEGER
TagR    ::=  [UNIVERSAL 82]   IA5String
TagS    ::=  [UNIVERSAL 83]   INTEGER
TagT    ::=  [UNIVERSAL 84]   INTEGER
TagU    ::=  [UNIVERSAL 85]   INTEGER
END
```

The tag specifications [UNIVERSAL 81], [UNIVERSAL 82], etc. cause the data to have the same tag as the ASCII values of 'P', 'Q', etc. For ASN.1, the input stream will also include tags marking the beginning of a sequence container or a set container (but not for a choice container), as shown in some examples below.

The target data format 205 of FIG. 2 includes a sequence container, SEQ_A, which includes a first schema object, P(a1), a second schema object, Q(a2), a choice container, CHOICE_B, and a third schema object, U(a6). The choice container, CHOICE_B includes a schema object, R(b3), and a set container, SET_C. The SET_C set container includes two schema objects S(c4) and T(c5). The P(a1) schema object, the CHOICE_B choice container, and the SET_C set container are all designated as being 'optional.' An optional designation means that the data object(s) represented by the designated container object or schema object is not required by the data format and that the input stream may or may not include a data object corresponding to that schema object. Objects can be designated as being optional, or as having some other property by corresponding labels appearing within the target data format. Some standards may provide for explicit designations of objects within a target data format, and some standards may provide for implicit designation of objects within a target data format. For example, some standards (e.g., EDI/EDIFACT) include a policy in which a target data format designates an entire container as optional if the first schema object in the container has an optional designation. Each container object defines what is referred to herein as a "scope" which encompasses all objects (i.e., schema objects and container objects) inside of the container. Thus, the scope of SEQ_A encompasses P(a1), Q(a2), CHOICE_B, and U(a6). The scope of CHOICE_B encompasses R(b3), SET_C, S(c4), and T(c5). The scope of SET_C encompasses S(c4) and T(c5).

Figure 3:
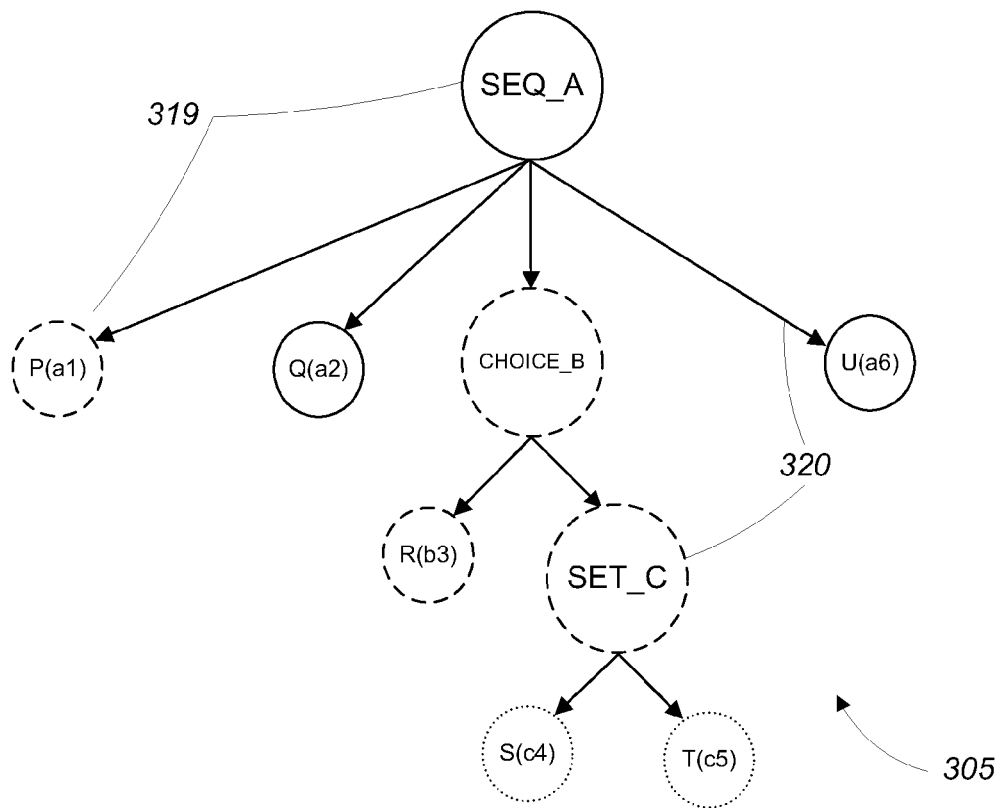
FIG. 3 is a diagram of a tree representation of an exemplary data format.

Referring to FIG. 3, the target data format 205 of FIG. 2 is shown as a tree 305 with the container objects and schema objects of the data format 205 shown as nodes 319 of the tree 305 and the relationships between the container objects and schema objects shown as edges 320 interconnecting the nodes 319. In general, the leaf nodes, which are associated with schema objects and their corresponding data objects, (called "data nodes") have an associated tag and field name corresponding to a data value, while the interior nodes associated with containers (called "container nodes") are valueless and may or may not be associated with tags.

Figure 4:
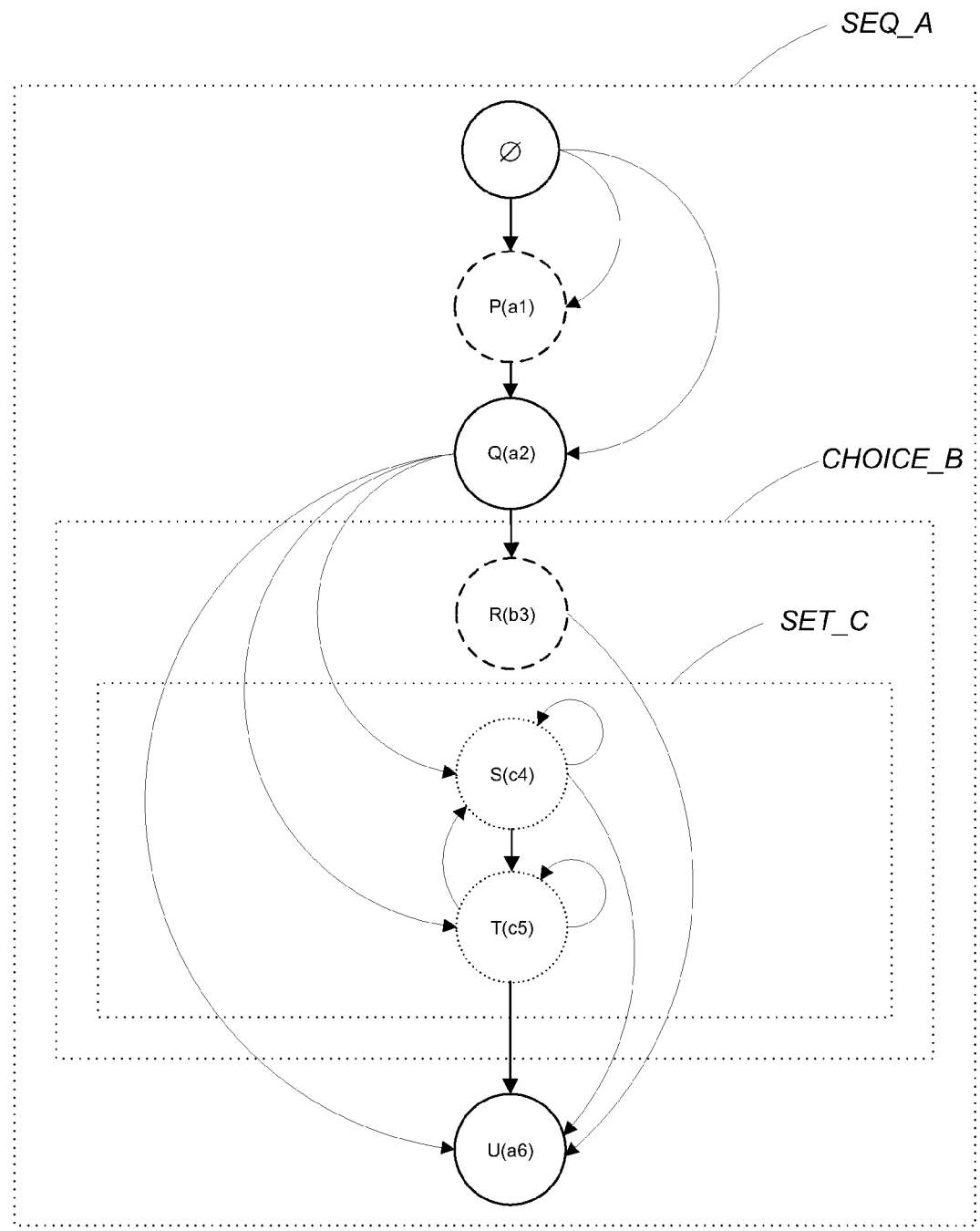
FIG. 4 is a transition diagram.

In operation, the tree is read from its top down and from its left hand side to its right hand side. In particular, referring to the simple transition diagram 400 of FIG. 4, a parser reading an input stream formatted according to the data format 205 of FIG. 2 starts at a root, Ø, starting state. The parser expects that the first tagged data object (e.g., a pair of a tag and its corresponding data value, called a tag-value pair) received from the input stream will be either the tag-value pair for the P(a1) schema object or the tag-value pair for the Q(a2) schema object (since the P(a1) schema object is designated as optional). If the tag-value pair for the P(a1) schema object is received from the input data stream, then the next tag-value pair received from the input stream must be the tag-value pair for the Q(a2) schema object.

Since the CHOICE_B container is optional, the next tag-value pair received from the input stream can be the tag-value pair for any of the U(a6), R(b3), S(c4), or T(c5) schema objects. For some standards (such as ASN.1), there will also be a tag marking the beginning of the SET_C, in the case of a tag-value pair for the S(c4), or T(c5) schema objects. If the tag-value pair for the R(b3) schema object is received, the next tag-value pair received from the input stream must be the tag-value pair for the U(a6) schema object. If the tag-value pair for the T(c5) schema object is received then the next tag-value pair received from the input stream must be the tag-value pair for the S(c4) schema object. Next, since the SET_C container is specified as a "vector" of set containers (denoted by the [ ] operator), one or more combinations of the tag-value pairs for the S(c4) and T(c5) schema objects can be received from the input stream (i.e., looping behavior is permitted). After the one or more combinations of the tag-value pairs for the S(c4) and T(c5) schema objects is received, the tag-value pair for the U(a6) schema object is received from the input stream. After the tag-value pair for the U(a6) schema object is received, the entire record has been received and the record is ended. Any subsequent tag-value pairs received are part of the next record.

2 Parser Generation

Figure 5A:
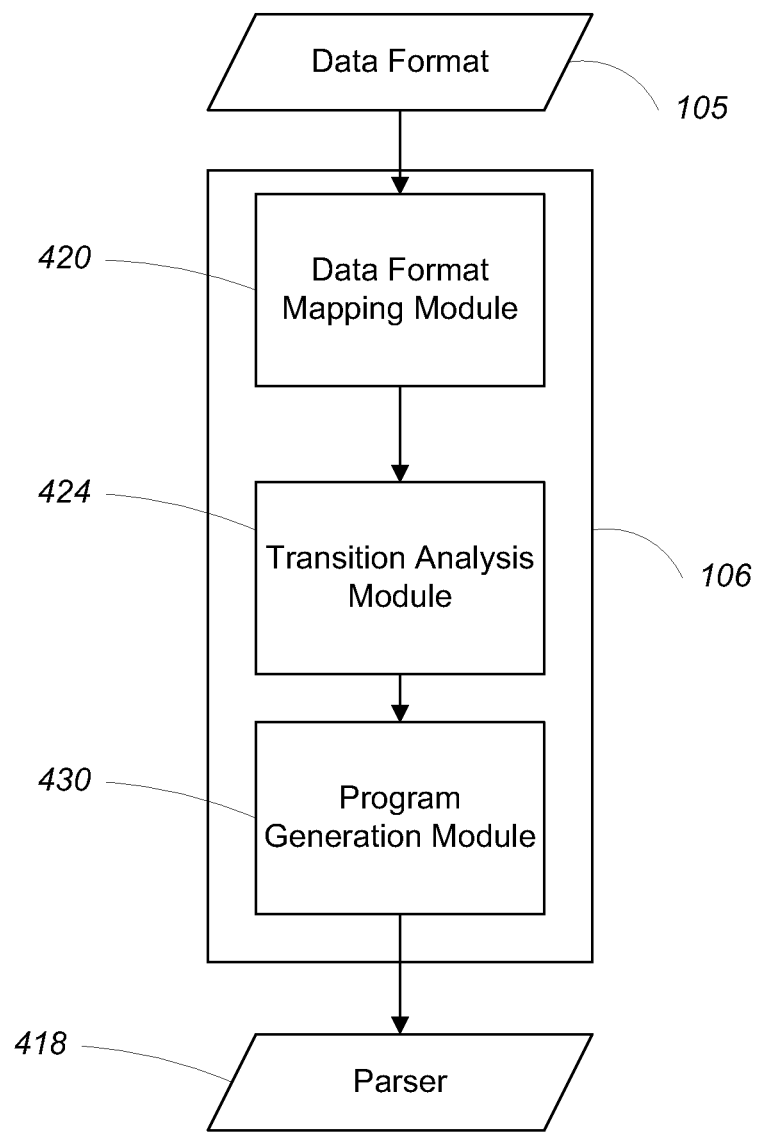
FIG. 5A is a diagram of a parser generation module.

Referring to FIG. 5A, one example of the parser generation module 106 of FIG. 1 is configured to receive the target data format 105 as input and to process the target data format 105 into a compiled parser program 418 which can validate and parse any target data format having a hierarchical tag-value structure with little or no preprocessing of the data. To do so, the parser generation module 106 determines a "global routing" through the hierarchical data format which includes identifying some or all of the permissible transition between elements of the hierarchical target data format. The parser generation module 106 includes a data format mapping module 420, a transition analysis module 424, and a program generation module 430.

Figure 5B:
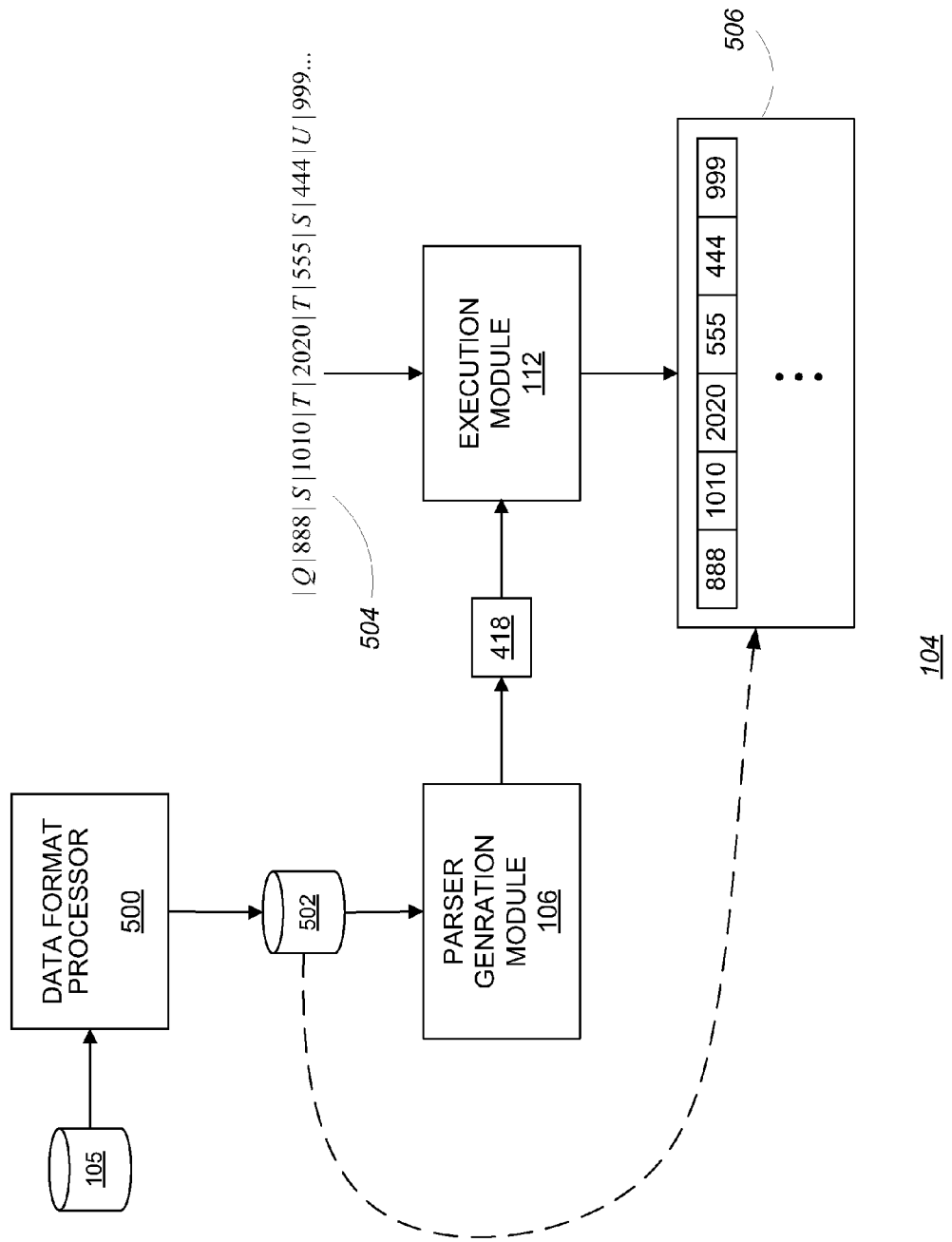
FIG. 5B is a diagram of an execution environment.

Referring to FIG. 5B, in some implementations, a data format processor 500 executed in the execution environment 104 pre-processes the target data format 105 to form processed data format information 502, which is representative of the target data format 105. This processed data format information 502 prepares the parser generation module 106 for generating a parser program 418 that is configured to parse a data stream 504 into a particular output record format 506 when that program 418 is executed by the execution module 112. So, the data format information 502 also includes a definition of the output record format 506. Any of a variety of techniques can be used to configure the data format processor 500 to pre-process the target data format 105, including the use of compiler-compilers (e.g., yacc or Bison) that accept a grammar of a standard (e.g., ASN.1) to which the data format 105 conforms, and output a format parser that the data format processor will use to generate the processed data format information 502 from the target data format 105.

The following is an example of the processed data format information 502 specified in a Data Manipulation Language (DML) generated from the example of the target data format 205 in ASN.1 notation shown above (saved in a file called "example.asn1").

```
constant int ASN1_UNKNOWN = -1;
constant int ASN1_SEQUENCE = 0;
constant int ASN1_SET = 1;
constant int ASN1_CHOICE = 2;
constant unsigned int ASN1_TYPE_NONE = 10;
constant unsigned int ASN1_TYPE_BOOLEAN = 11;
constant unsigned int ASN1_TYPE_INTEGER = 12;
constant unsigned int ASN1_TYPE_ENUMERATED = 13;
constant unsigned int ASN1_TYPE_REAL = 14;
constant unsigned int ASN1_TYPE_OID = 15;
constant unsigned int ASN1_TYPE_ROID = 16;
constant unsigned int ASN1_TYPE_BIT_STRING = 17;
constant unsigned int ASN1_TYPE_OCTET_STRING = 18;
constant unsigned int ASN1_TYPE_NULL = 19;
type asn1_descriptor_t = record
   unsigned int[int] tags;
   unsigned int[int] elem_tags = NULL;
   unsigned int type_encoding = ASN1_TYPE_NONE;
   unsigned int lineno = 0;
   unsigned int split = 0;
   unsigned int extensible_before = 0;
   unsigned int extensible_after = 0;
end;
```

-continued

```
type asn1_type_descriptor_t = record
   int rec_type;
   int file_id;
   asn1_descriptor_t tag_info;
end;
let string(int, charset='x-ab-internal') [int] g_filenames =
[vector "../example.asn1"];
// MOD
type   MOD_TagP = integer(8);
type   MOD_TagQ = integer(8);
type   MOD_TagR = ascii string(integer(4));
type   MOD_TagS = integer(8);
type   MOD_TagT = integer(8);
type   MOD_C =
record
   MOD_TagS c4;
   MOD_TagT c5;
   asn1_type_descriptor_t ASN_type_descriptor( ) = [record rec_type
ASN1_SET file_id 0 tag_info (asn1_descriptor_t) [record tags
[vector 68] lineno 22]];
   asn1_descriptor_t[int] ASN_field_descriptors( ) = [vector
      (asn1_descriptor_t) [record tags [vector 332] type_encoding
ASN1_TYPE_INTEGER lineno 22],
      (asn1_descriptor_t) [record tags [vector 336] type_encoding
ASN1_TYPE_INTEGER lineno 24] ];
end;
type MOD_B =
record
   int choiceId = -1;
   if (choiceId == 0)
      MOD_TagR b3;
   if (choiceId == 1)
      MOD_C [integer(4)] c;
   asn1_type_descriptor_t ASN_type_descriptor( ) = [record rec_type
ASN1_CHOICE file_id 0 tag_info (asn1_descriptor_t) [record tags
[vector ] lineno 16]];
   asn1_descriptor_t[int] ASN_field_descriptors( ) = [vector
      (asn1_descriptor_t) [record tags [vector 328] type_encoding
ASN1_TYPE_OCTET_STRING lineno 16],
      (asn1_descriptor_t) [record tags [vector 68] lineno 18] ];
end;
type   MOD_TagU = integer(8);
type   MOD_A =
record
   MOD_TagP a1 = NULL;
   MOD_TagQ a2;
   MOD_B b = NULL([record choiceId (int) -1]);
   MOD_TagU a6;
   asn1_type_descriptor_t ASN_type_descriptor( ) = [record rec_type
ASN1_SEQUENCE file_id 0 tag_info (asn1_descriptor_t) [record tags
[vector 64] lineno 7]];
   asn1_descriptor_t[int] ASN_field_descriptors( ) = [vector
      (asn1_descriptor_t) [record tags [vector 320] type_encoding
ASN1_TYPE_INTEGER lineno 7],
      (asn1_descriptor_t) [record tags [vector 324] type_encoding
ASN1_TYPE_INTEGER lineno 8],
      (asn1_descriptor_t) [record tags [vector ] lineno 9],
      (asn1_descriptor_t) [record tags [vector 340] type_encoding
ASN1_TYPE_INTEGER lineno 11] ];
end;
type DML_ASN1_decode_t = MOD_A;
```

In some implementations, the parser generation module 106 and the execution module 112 may be components of a common processing module or system for parsing data according to provided data format. For example, in a single dataflow graph, or a single component in a dataflow graph, may perform functions of both modules, with the processed data format information 502 and the input stream 504 as inputs to the dataflow graph. In some implementations, instead of providing an executable parser program 418, the parser generation module 106 may provide a parser as a data structure, for example, to efficiently store a representation of the transitions and context information needed to perform the parsing, such as an enumerated list of elaborated edges for a compilation tree representation, as described in more detail below.

2.1 Data Format Mapping

The data format 105 is first provided to the data format mapping module 420 which maps the data format 105 into an internal "target" data format that is usable by subsequent modules of the parser generation module 106. In some examples, the data format 105 is a standard format map file (e.g., an ASN.1, SWIFT, or X12 map file) and the internal target data includes a scope tree representation of the data format 105.

2.1.1 Data Format Mapping Example

Referring to FIG. 6, a scope tree representation 600 of the exemplary data format 205 of FIG. 2 explicitly denotes the different scopes present in the data format. The scope tree representation 600 does not include container object type or tag information. The container type and tag information is instead included in a compilation tree (or more generally, a directed acyclic graph (DAG)), wherein the tag and container type information is stored as attributes of compile nodes. As the compilation tree is traversed, the attributes are used to create edges. The compilation tree is described in further detail below.

In some examples, each schema object encompassed by the scopes 660 of the scope tree representation 600 is associated with an empty program table (not shown). Later steps in the parser compilation process fill the tables with "programs" which are associated with the scopes and schema objects and may include one or more parsing commands, which are described in more detail below.

2.2 Transition Analysis

The scope tree representation of the data format is passed from the data format mapping module 420 to the transition analysis module 424 which statically analyzes the scope tree representation of the data format to enumerate permissible transitions between the data objects within an input stream based on structure information (e.g., tags) within data objects in the input stream. Based on this enumeration, the program tables described above are populated with programs. To enumerate the permissible transitions, the transition analysis module 424 leverages the fact (illustrated in FIG. 3) that many data standards such as X12, SWIFT, HL7, and others can be represented as trees with schema objects as leaves representing data objects in the form of tag-value pairs, where the existence of one tag in the input stream may or may not require the existence of another tag or set of tags in the input stream (and the associated data values identified by those tags).

2.2.1 Transition Analysis Example

Figure 7:
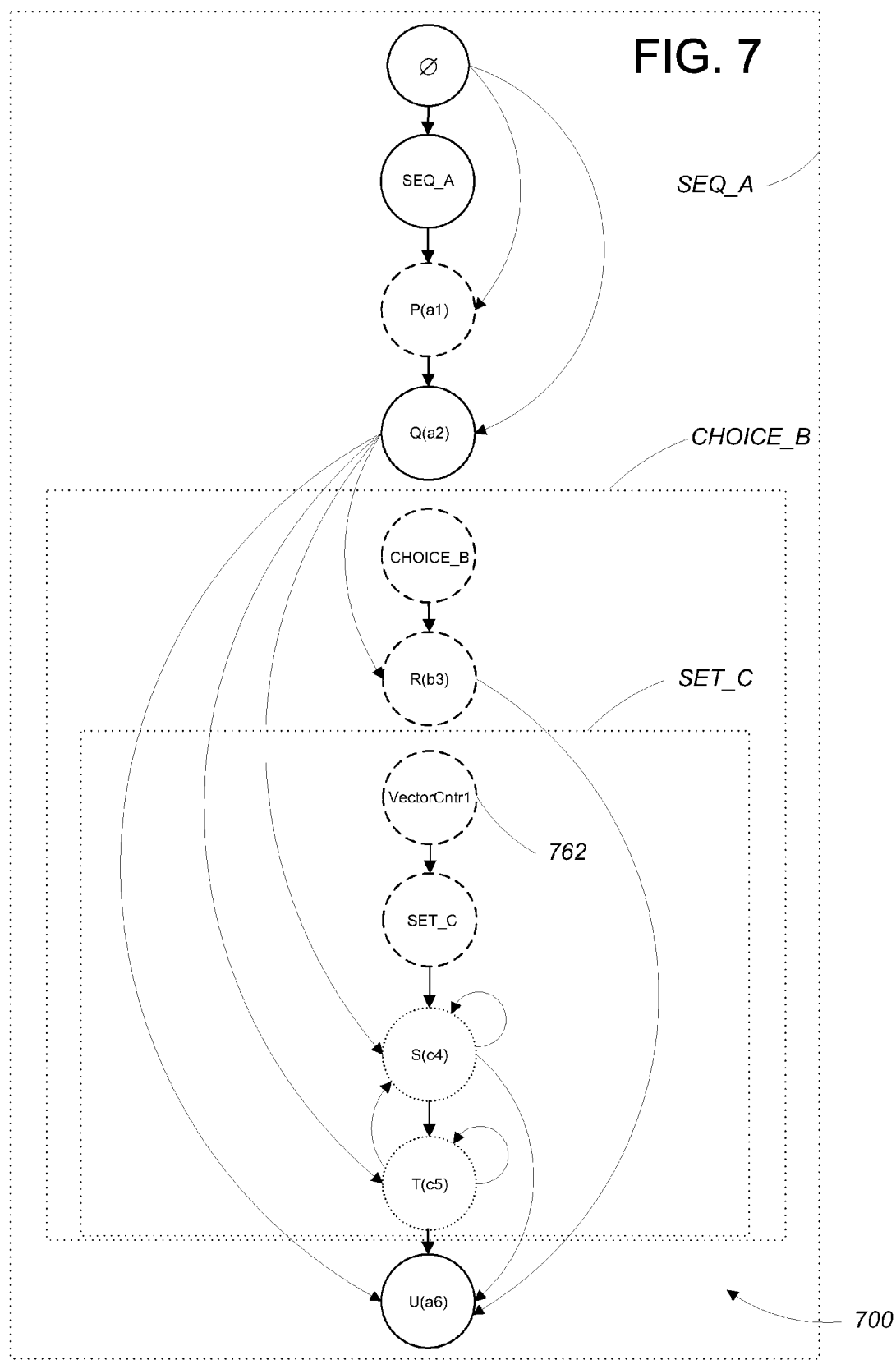
FIG. 7 is a detailed transition diagram for an exemplary data format.

Referring to FIG. 7, the transition analysis module 424 first forms a compilation tree representation 700 of the scope tree representation. As is noted above, the container objects and schema objects of the data format are represented as nodes ("container nodes" and "data nodes") in the tree, and the relationships between the container objects and data objects are represented as edges connecting the nodes of the tree. In some examples, if the data format includes a vector, the compilation tree representation 700 includes additional "VectorContainer" nodes 762 which are used internally by the transition analysis module 424 and assist in the transition analysis process.

The transition analysis module 424 walks through the compilation tree 700 and for each node representing a container object, computes a "fan-in" and "fan-out" of the node. The fan-in of a given container node is defined as all of the nodes (including both container and data nodes) within the scope of the container node that can be directly accessed from another node outside of the container node. Similarly, the fan-out of a given container node is defined as all of the nodes contained by the container node that can directly access a node outside of the given container node.

In general, when computing the fan-in and fan-out for set type containers, the children of the set must target each other. This can be accomplished by performing a Cartesian product on all the members of the set, treating the set itself as a loop and having all the fan-out nodes target all of the fan-in nodes. Care is taken to ensure that a given member of the set only targets itself if the set is a vector. For choice type containers, no members of the container target each other. For sequence type containers, the fan-out of each child, except the last one, targets the fan-in of the next child, and the one after that if the next child is optional (and so on). If a node itself is a vector, loop edges are created by visiting the fan-in of the vector node, and for each fan-in node, visiting the fan-out of the vector node thereby creating an edge from the fan-out to the fan-in.

For the exemplary data format shown in FIG. 2, SEQ_A has a single fan-in node, P(a1) and a single fan-out node, U(a6) since P(a1) and P(a1) and U(a6) are the first and last schema objects (respectively) in the container object and are required schema objects. CHOICE_B has a list of fan-in nodes consisting of R(b3) and SET_C since R(b3) is an optional schema object, meaning that Q(a2) can target either R(b3) or SET_C. CHOICE_B's list of fan-out nodes consists of R(b3) and SET_C. SET_C has a list of fan-in nodes consisting of S(c4) and T(c5) and a list of fan-out nodes consisting of S(c4) and T(c5). The VectorContainer node 762 represents a special, compilation specific type of container object which specifies that fan-out of the container can target the fan-in of the container as well as the fan-in of the next node in the sequence.

With the fan-in and fan-out for all of the container nodes computed, the edge creation process commences. The edge creation process starts with a top level container forming edges between itself and its children (i.e., all containers and schema objects within the scope of the container). In some examples, edges are created from the node of the top level container to each of the fan-in nodes associated with the container. Then, the children of the container are connected as appropriate. Upon completion of edge creation, the edges are "combined" including disabling duplicate and incomplete edges (e.g., edges created within a container but obviated by an outer container).

The transition analysis module 424 then walks the compilation tree representation 700 to create elaborated edges between the nodes of the tree (referred to as source nodes and target nodes). An elaborated edge is defined as a source node to destination node edge which includes routing information such as looping behavior and the highest node that is associated with the edge. In some examples, an elaborated edge includes data representing a source node for the edge, a target node for the edge, edge looping behavior, and a highest node for the edge. Possible values for the looping behavior include No_Loop (i.e., there is no looping behavior for the edge), End_Instance (i.e., there is looping behavior for the edge, where the current instance of the vector is ending and a new instance is starting), and End_Record (i.e., there is looping behavior for the edge, where the current record is ending and a new record is starting). The highest node for an edge is defined as the container in which the edge is created. If an edge is created within a VectorContainer when the looping behavior is End_Instance, then the highest node for the edge is the VectorContainer node. Otherwise, if an edge is created in a VectorContainer when the looping behavior is End_Record, the highest node for the edge is a special type of node designated as the "top node."

In general, when looping behavior is present (i.e., the looping behavior is not No_Loop) the highest node in the tree for the edge is the VectorContainer node. For example, when the edge from S(c4) to T(c5) from the VectorContainer with the looping behavior of End_Instance is created, S(c4) is the starting node, c5 is the target node, and VectorCntrl is the highest node for the edge.

Referring to FIG. 8, the enumerated list of elaborated edges for the compilation tree representation 700 of FIG. 7 is illustrated.

2.3 Ambiguity Resolution

Due to the possible inclusion of optional schema objects, vectors of undetermined length, repeated tags, and multiple scopes in the data format 105, there is a potential for ambiguities in recognizing transitions from one data object to another in the input stream. These ambiguities may arise as edges in the enumerated list (FIG. 8) that have the same source and destination. In some examples, the transition analysis module 424 discovers and resolves (either automatically or based on user input) ambiguities in the target data format 105.

2.3.1 Ambiguity Resolution Example

For example, for the exemplary data format of FIG. 2, ambiguities exists between multiple versions of the edge T(c5)→S(c4), and between multiple versions of the edge S(c4)→T(c5), due to the combination of the SET and vector containers. In particular, when there is a transition from a "T" tag to an "S" tag, or from an "S" tag to a "T" tag, it is unclear whether the transition is between data objects within the same set (i.e., a non-looping "inner edge"), or between a last data object in one set and a first data object in a subsequent set (i.e., a looping "outer edge"). Since the ambiguity is due to a looping construct, it can be automatically resolved by combining the two versions of the edges with the same source and destination into one edge that has multiple possible target actions. To do so in this example, the inner edge, which does not include looping behavior, is combined with the outer edge, which does include looping behavior. Generally, target actions for the multiple edges are stored in an ordered list of possible target actions, with a particular action selected based on traversing the list in order (e.g., an order based on the order of the scopes of the edges, from closest (inner) to farthest (outer)). The selection may be based on user input, or based on checking the context, such as a characteristic of the last value that was processed, or a decremented count (e.g., one item left in a pair of two items), or a tracked length (e.g., 4 bytes left to read out of 8 bytes in a set) as described in more detail below.

In some examples, any of a variety of types of disambiguation are used. For example, if the input data is formatted as ASN.1 basic encoding rules (BER) data, the data includes tag-length-value triplets and no true ambiguity can exist. In this case, any perceived ambiguity can be resolved automatically with the length information in the tag-length-value triplets. More generally, ambiguity detection and resolution can be used to quickly and effectively address ambiguity issues, including providing options such as ignoring ambiguities, performing automatic disambiguation, or performing user-assisted disambiguation.

The following is an example of a series of data objects that could appear within an input stream that is to be parsed. This example is based on ASN.1 data, except that integers are not encoded exactly as they would actually be encoded in ASN.1 data, for ease of reading. The data objects are in T|L|V form (Tag|Length|Value) where any Value could be another nested TLV triplet.

In this example, sets and sequences always have tags associated with them. A SET container in ASN.1 has a tag of [UNIVERSAL 17] by default, and a SEQUENCE container has a tag of [UNIVERSAL 16] by default. A SET OF container has the same tag as a SET. The tag for the element type (SET in this case) appears after the SET OF tag for each element of the vector. The numbers in the following example that correspond to Values that are "leaf values" (i.e., not themselves TLV triplets) are marked with '*' at the end of the Value. The only Tags in this example are 16, 17, 81, 82, 83, 84, 85; and all of the other numbers that are not Values or Tags are Lengths.

16|36|81|2|888*|17|24|17|10|83|2|1010*
|84|2|2020*|17|10|83|2|444*|84|2|555*|85|2|999*

The lengths are used to maintain an accumulator which is checked when there is an ambiguity or when the structural integrity of the data needs to be verified (e.g., upon departing a container node which has an expected length associated with it, a check is performed to ensure that the correct length or amount of data has been collected.). In the case of an ambiguity, the accumulator can be checked to determine which of the multiple target actions should be performed for an ambiguous edge from the previous tag to the current tag.

In some examples, the parser is configured to perform structural validation of incoming data. For example, if data received from the input stream arrives in an unexpected order, then the parser will issue an error. In another example, if data received from the input stream cannot be successfully parsed, then the parser will issue an error.

2.4 Parser Generation

Once the list of elaborated edges for the target data format 105 are determined, the list is provided to the program generation module 430, which generates the parser program 418. The list of elaborated edges includes sufficient information to build the programs to fill the tables created for the scope tree representation 600 of FIG. 6. In particular, the since the compilation tree representation 700 is a tree with a single root, sequences of parser operations (e.g., push( ), pop( ), and process( ) commands) can be derived from the source, destination, and highest nodes associated with an edge with the looping behavior specifying how VectorContainers are dealt with.

To build the programs, the compilation tree representation of FIG. 7 is again traversed. For each node of the compilation tree representation 700, each of the edges associated with the node are processed to generate a program for the edge. In general, to generate the program for an edge, the program generation module 430 first generates a control flow graph for the edge, the control flow graph including generated code (e.g., push( ), pop( ), and process( ) commands). The program generation module 430 then traverses the control flow graph to generate the program. Once the program for an edge is generated, the program is added to the appropriate table in the scope tree representation 600. In some examples, the program is keyed in the table using the tag associated with the source node of the edge associated with the program.

In some examples, while traversing the compilation tree representation 700, an expected length of a container object is coded when the container is entered such that that a comparison to the accumulated length can be made when the container is exited. Accumulation is coded taking care of tag overhead (e.g., the length of the tag in bytes) as nodes are entered and a check against the expected length of the container is done when the container is exited. In some examples, the accumulator is zeroed whenever a node is entered and an index of the length variable is saved into a known index of a global variable array so that the parser can deal with indefinite lengths.

When a container is exited, the accumulation value is added to the accumulation value of its parent container. In some examples, the default actions for unrecognized tags are coded within an extensible container. For set containers, a check is performed upon exiting the container to ensure that all fields required by the set are assigned. When parsing a value from the input stream into its appropriate form a data transformation is coded such that integer values, object identifiers, and so on can be properly decoded.

2.4.1 Program Generation Example

The following is a detailed explanation of program generation for a single edge (i.e., the S(c4)→T(c5), End_Instance edge, which after edge combination also includes the No_Loop transition) of the compilation graph representation 700.

To create a program for this edge, code generation is performed including first creating a control flow graph. A control flow graph is a standard compiler data structure which is a binary tree that includes nodes which include statements and a single condition:

```
stmt1,
stmt2,
...,
cond
``` where cond has two control flow graph edges: a true edge and a false edge. The edges associated with cond go to other nodes in the control flow graph. Given the source node, destination node, and the highest node for the edge, a control flow graph for the path between S(c4) and T(c5) can be determined by first representing the path having two directional paths, an UP path and a DOWN path as follows:

```
UP:    c4->SET_C->VectorContainer_1
DOWN:  VectorContainer_1->SET_C->c5
```

As the UP and DOWN paths are traversed, the statements and conditions of the control flow graph for the edge are generated and the edges of the control flow graph are connected with their respective nodes. In particular, when traversing the UP path of the edge, a virtual function named code_node_exit( ) is called for each node that is exited. In this case, code_node_exit( ) function is called twice, once for the S(c4) node and once for the SET_C node. This would normally add two POP( ) statements (i.e., commands) to the control flow graph. However, in this case an ambiguity exists. In particular, the edge, S(c4)→T(c5), No_Loop, is stored inside the of the looping edge (i.e., S(c4)→T(c5), End_instance). As the program generation module 430 is about to exit a node it checks against the list of combined edges within the looping edge. If the top node in the current element of the list of combined edges is the same as the node being exited then an ambiguity exists which must be resolved. One possible way of resolving the ambiguity is to call another virtual function, resolve_ambiguity( ), to allow a specialization to implement the resolution, or even issue an error if the ambiguity cannot be resolved. In this example, the resolve_ambiguity( ) function selects the No_Loop path if less than all of the required nodes in SET_C are assigned.

It is noted that in some examples, a SET container automatically has a variable attached to it, the variable specifying a number of required fields. When the program generation module 430 enters a SET container, the variable attached to the container is set to the number of required fields. As the program generation module visits each required field, the variable attached to the SET container is decremented. When the program generation module 430 leaves the SET, if the variable attached to the SET container is non-zero, an error is issued. For the S(c4)→T(c5) edge, no error is issued and the SET container is not exited due to the ambiguity.

Thus, for the UP path (i.e., c4→SET_C→VectorContainer_1), the following control flow graph statements are created:

```
cf_node_1 {
    c4->SET_C: POP
    if (SET_C_nr == 0)
        goto cf_node_2
    else
        goto cf_node_3
}
cf_node_2 {
    SET_C-> VectorContainer_1: POP
    ...
}
cf_node_3 {
    ...
}
```

At the top of the loop (i.e., at the VectorContainer_1 node) a virtual function named code_loop_top( ) is called since the looping behavior is not No_Loop. Since the ambiguity resolution allowed the program generation module 430 to continue up the looping edge, the program generation module 430 adds statements to the cf_node_2 node of the control flow graph. In this case, the instance is ended and the SET_C_nr variable is reset by adding the following statements to the cf_node_2 node of the control flow graph:

```
Vector_Container_1: End_Instance,
SET_C_nr = 2
```

For the DOWN path, a virtual function named code_node_enter( ) is called for each node that is entered. In this case, code_node_enter( ) is called three times once for SET_C, once for T(c5) for the looping edge, and once for T(c5) in the non-looping edge. For the non-looping edge, the path is traversed downwards using the cf_node_3 node of the control flow graph, including a simple transition of S(c4)→T(c5). Since T(c5) is within a SET container, the program generation module 430 must check if it has already been assigned. The assignment for the looping edge does not need to be checked because End_Instance insures that nothing has yet been assigned to the new instance. Thus, the cf_node_3 node of the control flow graph includes the following statements:

```
for cf_node_3:
    if (c5 is assigned)
        goto cf_node_4
    else
        error already_assigned
```

Since T(c5) is a required field, the SET_C_nr variable is decremented in the cf_node_4 node of the control flow graph as follows:

```
cf_node_4 {
    c4->c5: PUSH c5
    SET_C_nr = SET_C_nr − 1
    c5: PARSE
}
```

The cf_node_2 node of the control flow graph includes the same statements as the cf_node_4 node of the control flow graph. Thus, the final control graph is as follows:

```
cf
_node 1 {
    c4->SET_C: POP
    if (SET_C_nr == 0)
        goto cf_node_2
    else
        goto cf_node_3
}
cf_node_2 {
    SET_C->VectorContainer_1: POP
    VectorContainer_1: End_Instance
    SET_C_nr = 2
    c4->c5: PUSH c5
    SET_C_nr = SET_C_nr − 1
    c5: PARSE
}
cf_node_3 {
    if (c5 is assigned)
        goto cf_node_4
    else
        error already_assigned
}
cf_node_4 {
    c4->c5: PUSH c5
    SET_C_nr = SET_C_nr − 1
    c5: PARSE
}
```

The control flow graph for each of the edges is traversed to assemble bytecodes for the edge. The result of the traversal of the control flow graph is a program for the edge. The program is stored in the appropriate table of the scope data representation 600 of FIG. 6. Once the programs for each edge are generated (according to the above procedure), the parser program 418 is output from the program generation module 430.

3 Data Operation Example

The following description describes an example of parsing an exemplary stream of input data using a parser compiled according to the above techniques and configured to process data formatted according to the data format 205 of FIG. 2. After a transition from one data object (object "a") to another (object "b") is recognized in the input stream, the parser may apply one or more data operations to object b using a "process(b)" command, for example.

Figure 9:
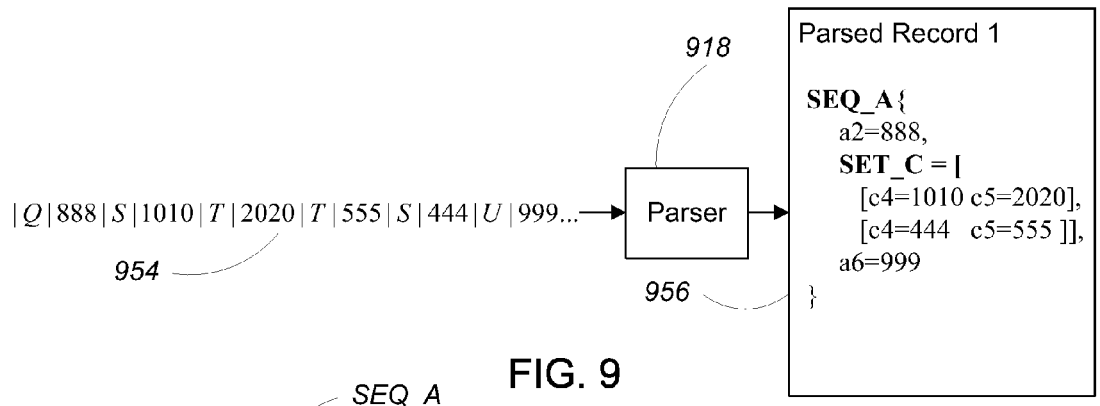
FIG. 9 is an example of a parser parsing data from an input stream.
Figure 10:
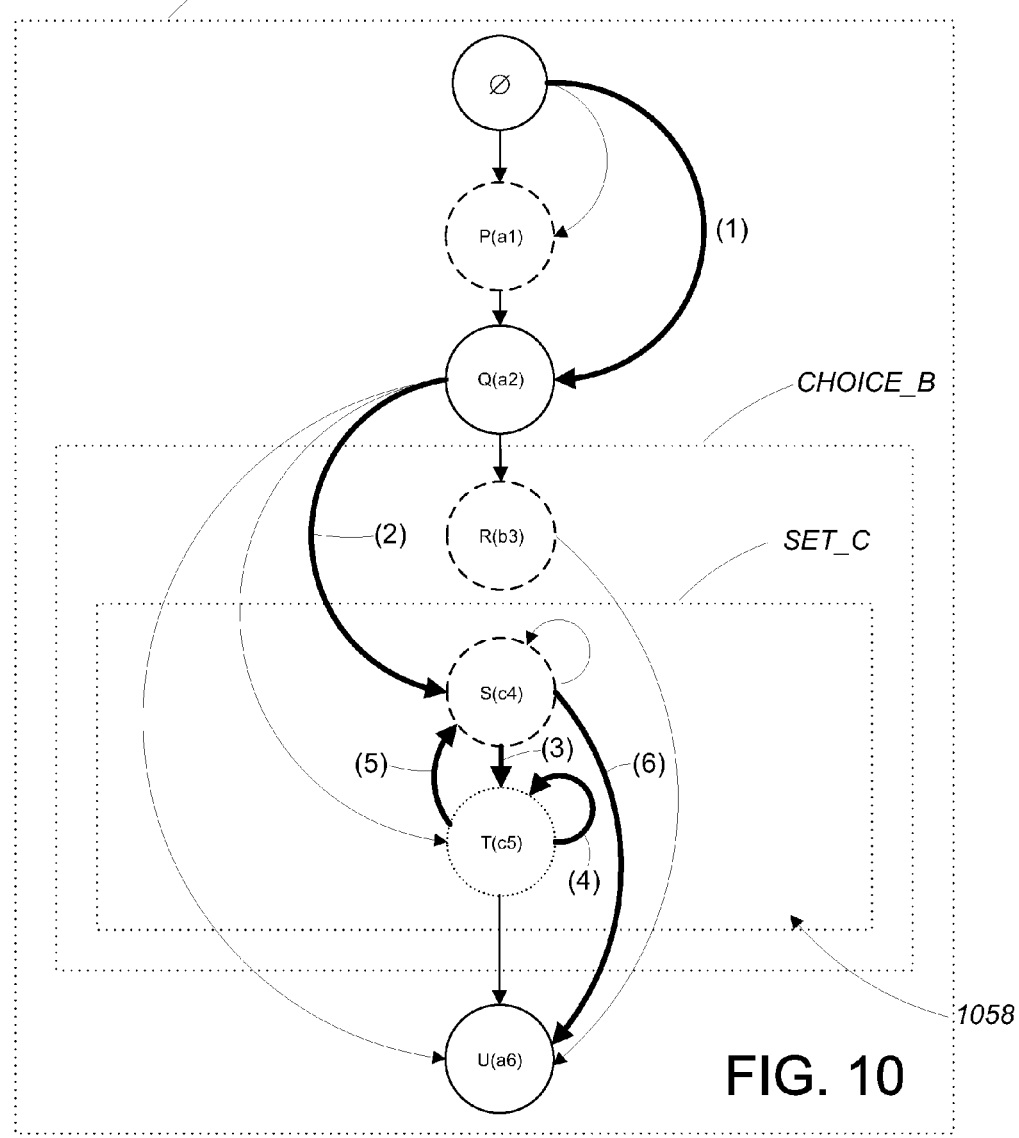
FIG. 10 is a transition diagram highlighting the transitions followed by the parser when parsing the data of FIG. 9.

Referring to FIGS. 9-11, an exemplary operation of a parser 928 generated by the parser generation module 106 as described above is illustrated. In the example, the parser 928 receives the following input stream:

|Q|888|S|1010|T|2020|T|555|S|444|U|999 . . . .

Referring to FIG. 9, the input stream 954 is shown entering the parser and being parsed into a record 756. Also referring to FIG. 10, the transition diagram 1058 followed by the parser includes arrows in bold and numbered (1)-(5) indicating the transitions used by the parser to process the input stream 954. In particular, before receiving any data from the input stream, the parser is at its Ø state. The parser then receives a tag Q, followed by a value 888 from the input stream. The input causes a first parser transition, (1), in which the parser transitions from its Ø state to its Q(a2) state. As is shown in FIG. 11, the transition from Ø to Q(a2) is associated with a parser program which includes a process (a2) data operation which reads the value 888 into the a2 field of the first record.

The parser then receives a tag S, followed by a value 1010 from the input stream. The input causes a second parser transition, (2), in which the parser transitions from its Q(a2) state to its S(c4) state. As is shown in FIG. 11, the transition from Q(a2) to S(c4) is associated with a parser program which includes a push(SCOPE_B) command, a push(SCOPE_C) command, and a process(c4) command. The push (SCOPE_B) command causes the parser to push into the scope of the CHOICE_B container, the push(SCOPE_C) command causes the parser to push into the scope of the SET_C container, and the process(c4) command causes the parser to read the value 1010 into the c4 field of the first record.

The parser then receives a tag T, followed by a value 2020 from the input stream. The input causes a third parser transition, (3), in which the parser transitions from its S(c4) state to its T(c5) state. As is shown in FIG. 11, the transition from S(c4) to T(c5) is associated with a parser program which includes a process(c5) command which causes the parser to read the value 2020 into the c5 field of the first record. Note that no push( ) or pop( ) commands are necessary in this situation since the parser is already in SCOPE_C.

The parser then receives another tag T, followed by a value 555 from the input stream. Multiple values for the tag T are permissible in this case because T(c5) is a schema object which is part of a SET container (i.e., SET_C). SET containers include an unordered set of items from which one or more objects can be chosen, including multiple of the same object. The input causes a fourth parser transition, (4), in which the parser transitions from its T(c5) state in a looping manner back to its T(c5) state. As is shown in FIG. 11, the looping transition from T(c5) to T(c5) is associated with a program which includes an End_Instance( ) command (i.e., to indicate that a second instance of the SET_C container is being received) and a process(c5) command which causes the parser to read the value 555 into a second instance of the c5 field in the first record.

The parser then receives another tag S, followed by a value 444 from the input stream. Again, multiple values for the tag S are permissible in this cause because the S(c4) schema object is part of a SET container (i.e., SET_C). The input causes a fifth parser transition, (5), in which the parser transitions from its T(c5) state to its S(c4) state. As is shown in FIG. 11, the transition from T(c5) to S(c4) is associated with a parser program which includes a process(c4) command which causes the parser to read the value 444 into a second instance of the c4 field in the first record.

Finally, the parser receives a tag U, followed by a value 999 from the input stream. The input causes a sixth parser transition, (6), in which the parser transitions from its S(c4) state to its U(a6) state. As is shown in FIG. 11, the transition from S(c4) to T(c5) is associated with a parser program which includes a pop(SCOPE_C) command, a pop (SCOPE_B) command, and a process(a6) command. The pop(SCOPE_C) command causes the parser to pop out of the scope of the SET_C container, the pop(SCOPE_B) command causes the parser to pop out of the scope of the CHOICE_B container, and the process(a6) command causes the parser to read the value 999 into the a6 field of the first record. At this point the first record is complete and the parser can create a new record which will be filled by subsequent data received from the input stream.

4 Alternatives

In some examples, rather than generating a compiled parser including all permissible transitions, the transitions required by the parser can be compiled on-demand (i.e., transitions are not compiled into the parser until needed). Doing so takes advantage of the fact that messages from the input stream are typically sparse in that message standards are large but the actual messages usually only implement a small fraction of the standard.

The techniques described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

While the approaches presented above are described as being implemented using dataflow graphs, it is noted that the approaches can be implemented using any suitable programming language. That is, the approaches are not limited to use in a dataflow graph environment.

In some examples, the compilation tree described above includes additional types of nodes in order to handle special situations and exceptions in standards. In some examples, the compilation tree includes four different types of special nodes: a root node, vector container nodes, empty tag nodes, and fan-out-only nodes. The root node (which is mentioned above) denotes the beginning state of the compilation tree. The vector container node (which is also mentioned above) is used for the handling of loops in the compilation tree. The empty tag node is used to represent unrecognized tags. An empty tag node may be used, for example, in association with the ASN.1 standard where there is a notion of an extension marker, where unrecognized tags are ignored. The fan-out-only node is used to represent a container that is associated with a tag but all of its children (i.e., members) are optional. That is, the container may be entered and then exited without performing any data operations. A fan-out-only node may be used, for example, in association with the ASN.1 standard which includes containers that are required but have entirely optional contents. The fan-out-only node is inserted as a node within a container so that the fan-out of the container can be targeted directly.

In some examples, extension markers in the ASN.1 standard require special handling. Consider the following two sequences:

```
TopSeq ::= SEQUENCE {
  seq BottomSeq,
  ...
}
BottomSeq ::= SEQUENCE {
  str1 [0] IA5String,
  str2 [1] IA5String OPTIONAL,
}
```

A transition from str1 to str2 in BottomSeq is ambiguous due to the extension marker (i.e., ' . . . ') in TopSeq since the tag [1] may be an ignored tag in TopSeq. To handle this situation, during ambiguity resolution the transition from str1 to str2 is forcefully made ambiguous such that it also targets the extension marker (i.e., ' . . . ') in TopSeq.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for generating a data parser for parsing an input stream of data objects, the method including:
    receiving information representative of a hierarchical data format defining a plurality of objects organized in a hierarchy, the objects including one or more schema objects representing data objects, and one or more container objects each associated with one or more schema objects; and
    processing the received information to form the data parser, the processing including:
        determining permissible transitions between successive data objects in the input stream, based at least in part on the information representative of the hierarchical data format, including determining permissible transitions between the objects of the hierarchical data format in the input stream, and including generating a compilation tree representation of the hierarchical data format, the compilation tree representation including a plurality of nodes interconnected by a plurality of edges with at least some of the plurality of nodes representing one of the plurality of objects defined by the hierarchical data format and at least some of the plurality of nodes representing compilation specific objects;

associating one or more data operations with each of the determined permissible transitions; and storing a specification for configuring a processor to execute the data parser to: (1) recognize a transition between a first data object and a second data object in the input stream, and (2) perform a data operation associated with the recognized transition on a data value within the second data object based at least in part on a context associated with one or more previously recognized transitions.

2. The method of claim 1 wherein the information representative of the hierarchical data format includes a tree representation of the hierarchical data format including a plurality of nodes interconnected by a plurality of edges with each of the plurality of nodes representing one of the plurality of objects defined by the hierarchical data format.

3. The method of claim 2 wherein the context associated with one or more previously recognized transitions corresponds to a position in the tree representation of the hierarchical data format.

4. The method of claim 3 wherein the one or more data operations includes an operation for pushing into a scope of a container object, an operation for popping out of a scope of a container object, and an operation for reading a value of a data object.

5. The method of claim 1 wherein the at least one of the schema objects includes a tag that is included with a corresponding data object represented by the schema object.

6. The method of claim 1 wherein the container objects include at least one container object representing at least one of: a sequence of contained data objects within the input stream, a set of contained data objects within the input stream, or a choice of one contained data object within the input stream among multiple possible data objects.

7. The method of claim 1 wherein at least some of the container objects are specified as representing a series of multiple containers of data objects within the input stream.

8. The method of claim 1 wherein at least some objects of the plurality of objects are designated in the hierarchical data format as optional.

9. The method of claim 1 wherein the nodes representing compilation specific objects include one or more of vector container nodes, root nodes, empty tag nodes, and fan-out only nodes.

10. The method of claim 1 wherein determining permissible transitions between the objects of the hierarchical data format in the input stream includes processing the compilation tree representation to determine all permissible transitions between the nodes of the compilation tree representation.

11. The method of claim 10 wherein processing the compilation tree representation to determine all permissible transitions between the nodes of the compilation tree representation includes, for each node of the compilation tree representation, determining all nodes that have transitions to the node and determining all nodes to which the node has at least one transition.

12. The method of claim 10 wherein processing the compilation tree representation to determine all permissible transitions between the nodes of the compilation tree representation includes combining duplicate transitions between the nodes and eliminating incomplete transitions between the nodes.

13. The method of claim 10 wherein generating the compilation tree representation further comprises generating an elaborated edge for each permissible transition identified, the elaborated edge including a source node associated with the transition, a destination node associated with the transition, a container node associated with the transition, and a looping behavior associated with the transition.

14. The method of claim 13 wherein associating one or more data operations with each of the identified transitions includes analyzing each elaborated edge to determine the one or more data operations.

15. The method of claim 1 wherein determining permissible transitions between the objects of the hierarchical data format in the input stream includes generating an output that includes at least one of: an indication that the hierarchical data format does not include any ambiguous definitions, an indication that the hierarchical data format does include one or more ambiguous definitions, or one or more possible resolutions of any ambiguous definitions included in the hierarchical data format.

16. The method of claim 1 wherein data representative of the hierarchical data format is specified using at least one of: ASN.1 notation, XML, notation, SWIFT notation, X12 notation, and HL7 notation.

17. A system for generating a data parser for parsing an input stream formatted according to a hierarchical data format, the system including:

an input device or port configured to receive information representative of a hierarchical data format defining a plurality of objects organized in a hierarchy, the objects including one or more schema objects representing data objects, and one or more container objects each associated with one or more schema objects; and at least one processor configured to process the received information to form the data parser, the processing including:

determining permissible transitions between successive data objects in the input stream, based at least in part on the information representative of the hierarchical data format, including determining permissible transitions between the objects of the hierarchical data format in the input stream, and including generating a compilation tree representation of the hierarchical data format, the compilation tree representation including a plurality of nodes interconnected by a plurality of edges with at least some of the plurality of nodes representing one of the plurality of objects defined by the hierarchical data format and at least some of the plurality of nodes representing compilation specific objects;

associating one or more data operations with each of the determined permissible transitions; and storing a specification for configuring a processor to execute the data parser to: (1) recognize a transition between a first data object and a second data object in the input stream, and (2) perform a data operation associated with the recognized transition on a data value within the second data object based at least in part on a context associated with one or more previously recognized transitions.

18. The system of claim 17 wherein the information representative of the hierarchical data format includes a tree representation of the hierarchical data format including a plurality of nodes interconnected by a plurality of edges with each of the plurality of nodes representing one of the plurality of objects defined by the hierarchical data format.

19. The system of claim 18 wherein the context associated with one or more previously recognized transitions corresponds to a position in the tree representation of the hierarchical data format.

20. The system of claim 19 wherein the one or more data operations includes an operation for pushing into a scope of a container object, an operation for popping out of a scope of a container object, and an operation for reading a value of a data object.

21. The system of claim 17 wherein the at least one of the schema objects includes a tag that is included with a corresponding data object represented by the schema object.

22. The system of claim 17 wherein the container objects include at least one container object representing at least one of: a sequence of contained data objects within the input stream, a set of contained data objects within the input stream, or a choice of one contained data object within the input stream among multiple possible data objects.

23. The system of claim 17 wherein at least some of the container objects are specified as representing a series of multiple containers of data objects within the input stream.

24. The system of claim 17 wherein at least some objects of the plurality of objects are designated in the hierarchical data format as optional.

25. The system of claim 17 wherein the nodes representing compilation specific objects include one or more of vector container nodes, root nodes, empty tag nodes, and fan-out only nodes.

26. The system of claim 17 wherein determining permissible transitions between the objects of the hierarchical data format in the input stream includes processing the compilation tree representation to determine all permissible transitions between the nodes of the compilation tree representation.

27. The system of claim 26 wherein processing the compilation tree representation to determine all permissible transitions between the nodes of the compilation tree representation includes, for each node of the compilation tree representation, determining all nodes that have transitions to the node and determining all nodes to which the node has at least one transition.

28. The system of claim 26 wherein processing the compilation tree representation to determine all permissible transitions between the nodes of the compilation tree representation includes combining duplicate transitions between the nodes and eliminating incomplete transitions between the nodes.

29. The system of claim 26 wherein generating the compilation tree representation further comprises generating an elaborated edge for each permissible transition identified, the elaborated edge including a source node associated with the transition, a destination node associated with the transition, a container node associated with the transition, and a looping behavior associated with the transition.

30. The system of claim 29 wherein associating one or more data operations with each of the identified transitions includes analyzing each elaborated edge to determine the one or more data operations.

31. The system of claim 17 wherein determining permissible transitions between the objects of the hierarchical data format in the input stream includes generating an output that includes at least one of: an indication that the hierarchical data format does not include any ambiguous definitions, an indication that the hierarchical data format does include one or more ambiguous definitions, or one or more possible resolutions of any ambiguous definitions included in the hierarchical data format.

32. The system of claim 17 wherein data representative of the hierarchical data format is specified using at least one of: ASN.1 notation, XML, notation, SWIFT notation, X12 notation, and HL7 notation.

33. A system for generating a data parser for parsing an input stream formatted according to a hierarchical data format, the system including:
  means for receiving information representative of a hierarchical data format defining a plurality of objects organized in a hierarchy, the objects including one or more schema objects representing data objects, and one or more container objects each associated with one or more schema objects; and
  means for processing the received information to form the data parser, the processing including:
    determining permissible transitions between successive data objects in the input stream, based at least in part on the information representative of the hierarchical data format, including determining permissible transitions between the objects of the hierarchical data format in the input stream, and including generating a compilation tree representation of the hierarchical data format, the compilation tree representation including a plurality of nodes interconnected by a plurality of edges with at least some of the plurality of nodes representing one of the plurality of objects defined by the hierarchical data format and at least some of the plurality of nodes representing compilation specific objects;
    associating one or more data operations with each of the determined permissible transitions; and
    storing a specification for configuring a processor to execute the data parser to: (1) recognize a transition between a first data object and a second data object in the input stream, and (2) perform a data operation associated with the recognized transition on a data value within the second data object based at least in part on a context associated with one or more previously recognized transitions.

34. A non-transitory computer-readable medium storing software for generating a data parser for parsing an input stream of data objects, the software including instructions for causing a computing system to:
  receive information representative of a hierarchical data format defining a plurality of objects organized in a hierarchy, the objects including one or more schema objects representing data objects, and one or more container objects each associated with one or more schema objects; and
  process the received information to form the data parser, the processing including:
    determining permissible transitions between successive data objects in the input stream, based at least in part on the information representative of the hierarchical data format, including determining permissible transitions between the objects of the hierarchical data format in the input stream, and including generating a compilation tree representation of the hierarchical data format, the compilation tree representation including a plurality of nodes interconnected by a plurality of edges with at least some of the plurality of nodes representing one of the plurality of objects defined by the hierarchical data format and at least some of the plurality of nodes representing compilation specific objects;
    associating one or more data operations with each of the determined permissible transitions; and storing a specification for configuring a processor to execute the data parser to: (1) recognize a transition between a first data object and a second data object in the input stream, and (2) perform a data operation associated with the recognized transition on a data value within the second data object based at least in part on a context associated with one or more previously recognized transitions.

35. The non-transitory computer-readable medium of claim 34 wherein the information representative of the hierarchical data format includes a tree representation of the hierarchical data format including a plurality of nodes interconnected by a plurality of edges with each of the plurality of nodes representing one of the plurality of objects defined by the hierarchical data format.

36. The non-transitory computer-readable medium of claim 35 wherein the context associated with one or more previously recognized transitions corresponds to a position in the tree representation of the hierarchical data format.

37. The non-transitory computer-readable medium of claim 36 wherein the one or more data operations includes an operation for pushing into a scope of a container object, an operation for popping out of a scope of a container object, and an operation for reading a value of a data object.

38. The non-transitory computer-readable medium of claim 34 wherein the at least one of the schema objects includes a tag that is included with a corresponding data object represented by the schema object.

39. The non-transitory computer-readable medium of claim 34 wherein the container objects include at least one container object representing at least one of: a sequence of contained data objects within the input stream, a set of contained data objects within the input stream, or a choice of one contained data object within the input stream among multiple possible data objects.

40. The non-transitory computer-readable medium of claim 34 wherein at least some of the container objects are specified as representing a series of multiple containers of data objects within the input stream.

41. The non-transitory computer-readable medium of claim 34 wherein at least some objects of the plurality of objects are designated in the hierarchical data format as optional.

42. The non-transitory computer-readable medium of claim 34 wherein the nodes representing compilation specific objects include one or more of vector container nodes, root nodes, empty tag nodes, and fan-out only nodes.

43. The non-transitory computer-readable medium of claim 34 wherein determining permissible transitions between the objects of the hierarchical data format in the input stream includes processing the compilation tree representation to determine all permissible transitions between the nodes of the compilation tree representation.

44. The non-transitory computer-readable medium of claim 43 wherein processing the compilation tree representation to determine all permissible transitions between the nodes of the compilation tree representation includes, for each node of the compilation tree representation, determining all nodes that have transitions to the node and determining all nodes to which the node has at least one transition.

45. The non-transitory computer-readable medium of claim 43 wherein processing the compilation tree representation to determine all permissible transitions between the nodes of the compilation tree representation includes combining duplicate transitions between the nodes and eliminating incomplete transitions between the nodes.

46. The non-transitory computer-readable medium of claim 43 wherein generating the compilation tree representation further comprises generating an elaborated edge for each permissible transition identified, the elaborated edge including a source node associated with the transition, a destination node associated with the transition, a container node associated with the transition, and a looping behavior associated with the transition.

47. The non-transitory computer-readable medium of claim 46 wherein associating one or more data operations with each of the identified transitions includes analyzing each elaborated edge to determine the one or more data operations.

48. The non-transitory computer-readable medium of claim 34 wherein determining permissible transitions between the objects of the hierarchical data format in the input stream includes generating an output that includes at least one of: an indication that the hierarchical data format does not include any ambiguous definitions, an indication that the hierarchical data format does include one or more ambiguous definitions, or one or more possible resolutions of any ambiguous definitions included in the hierarchical data format.

49. The non-transitory computer-readable medium of claim 34 wherein data representative of the hierarchical data format is specified using at least one of: ASN.1 notation, XML, notation, SWIFT notation, X12 notation, and HL7 notation.

* * * * *